Oct. 10, 1939.   C. C. CAMPBELL   2,175,502

BUMPER GUARD

Filed April 8, 1938

Inventor:
Christopher C. Campbell
By Martin E. Anderson
Attorney

Patented Oct. 10, 1939

2,175,502

UNITED STATES PATENT OFFICE 2,175,502

BUMPER GUARD

Christopher C. Campbell, Denver, Colo.

Application April 8, 1938, Serial No. 200,961

2 Claims. (Cl. 293—55)

This invention relates to improvements in bumper guards and has reference more particularly to a bumper guard clamping device for securing the guard to a bumper.

In the present design of automobiles the radiators are, as a rule, provided with an ornamental front or grille and in most cases this projects a considerable distance to the front of the radiator with the result that it is in a position to be badly bent and damaged whenever the rear bumper of an automobile passes over the front bumper, as they frequently do.

In order to prevent a rear bumper on one car from passing over the front bumper on another car, the front bumpers are often provided with cross bars of various lengths and shapes.

One popular type of bumper guard is made in the form of an inverted capital letter V and is clamped to the rear of the front bumper with its apex at the top. Since such guards and grille protectors are quite high, it is impossible for the rear bumper of another car to pass over them and as long as they remain securely attached to the bumper they serve to protect the radiator grille. This type of guard is usually attached to the bumper by clips that frequently release their hold when subjected to severe strains and it frequently happens, therefore, that the radiator grilles are damaged in spite of the supposed protection thus afforded.

It is evident that one extremely important consideration to be provided for is a reliable means for securing the guard to the front bumper so that it cannot be accidentally disconnected from the bumper, even when subjected to forces strong enough to bend it.

It is the object of this invention to produce a bumper guard and grille protector of such construction that it can readily be attached to a front bumper and which, when attached, will positively remain in place until removed by a mechanic.

Another object is to provide a bumper guard assembly that cannot be separated after the parts have been assembled so as to prevent loss of parts during shipment and handling.

The invention can be most clearly explained and most readily understood when reference is had to the accompanying drawing in which it has been illustrated and in which.

Figure 1:
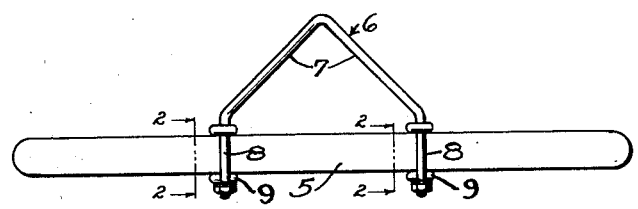
Figure 1 is a front view of a front bumper showing my improved guard in position thereon.

In the drawing numeral 5 designates the front bumper bar of an automobile. The bumper is attached to the car by any suitable means and since the particular attaching means is immaterial none has been shown.

Figure 2:
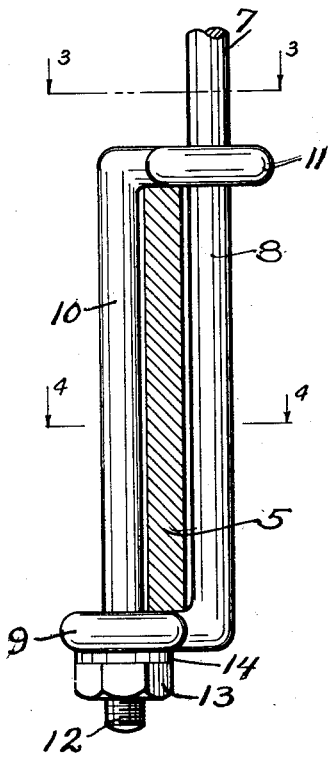
Figure 2 is a section taken on line 2—2 Fig. 1.
Figure 3:
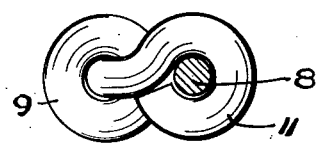
Figure 3 is a section taken on line 3—3 Fig. 2.
Figure 4:
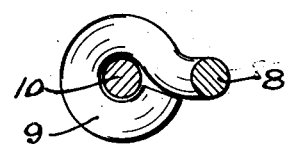
Figure 4 is a section taken on line 4—4 Fig. 2.

Attached to the bumper is a guard or grille protector 6 which is formed from a round rod and bent at its middle point into a V-shape. This protector is secured in place with its apex at the top and the inclined sides 7 terminate in straight portions 8 that are substantially parallel with the perpendicular bisector of the angle included between sides 7. The lower ends of parts 8 are bent at right angles to the plane of the guard and the ends are bent into eyes 9. Before the eyes are formed clamping bolts 10, having eyes 11, bent at right angles, are threaded onto the parts 8. The lower ends of members 10 are provided with threaded portions 12 for the reception of a nut 13. A lock washer 14 is positioned between the nut and the eye 9, in the manner shown in Fig. 2. It will be observed that after the assembly is completed, bolts 10 cannot be removed but form a part of the assembly.

When the guard or protector is to be attached to the bumper, bolts 10 are passed downwardly across the rear side of the bumper while parts 8 pass down across the front of the bumper. The lower ends of bolts 10 pass through eyes 9 and the washer and nut are then applied. When the nut is turned in a direction to move it upwardly along the bolt 10, the latter is moved downwardly until eye 11 engages the upper edge of the bumper and eye 9 the lower edge. When the nut is tightened, the guard becomes firmly attached to the bumper and cannot be removed without removing the nut or breaking part 8 or bolt 10. Such a means makes it certain that the guard will not be accidentally disconnected from the bumper. If desired, parts 8 may be positioned to the rear of the bumper and bolts 10 at the front.

It will be evident from the above that the guard assembly comprises three parts, the protector proper, and two clamp bolts 10, together with the nuts and washers. The bolts 10 cannot be removed and will therefore never get lost. The whole assembly is sold as a unit.

Having described the invention what is claimed as new is:

1. A bumper guard comprising a bar bent at its middle point into a shape resembling in a general way the inverted capital letter V, the ends of the inclined sides being bent inwardly so as to become substantially parallel with the bisector of the angle between the sides, the extreme ends being formed into eyes whose planes are perpendicular to the plane of the protector, each end of the guard having attached thereto a bolt whose end is provided with an eye that encloses one leg of the guard, the eyes of the bolts being in planes substantially perpendicular to the bolts, the ends of the bolts being positioned to pass through the eyes at the ends of the guard to form with the latter a rectangular opening for the reception of a bumper bar.

2. A bumper guard comprising a bar bent at its middle point into a shape resembling in a general way the inverted capital letter V, the extreme ends being formed into eyes whose planes are perpendicular to the plane of the protector, each end of the guard having attached thereto a bolt whose end is provided with an eye that encloses one leg of the guard, the eyes of the bolts being in planes substantially perpendicular to the bolt, the ends of the bolts being positioned to pass through the eyes at the ends of the guard to form with the latter a rectangular opening for the reception of a bumper bar, the three parts forming a permanently connected assembly.

CHRISTOPHER C. CAMPBELL.